United States Patent
Wang et al.

(10) Patent No.: US 11,892,641 B2
(45) Date of Patent: Feb. 6, 2024

(54) IMAGING METHOD FOR A HEAD-MOUNTED DISPLAY AND HEAD-MOUNTED DISPLAY

(71) Applicant: GOERTEK INC., Shandong (CN)

(72) Inventors: Pengjie Wang, Shandong (CN); Lihua Lu, Shandong (CN); Xiaojian Liu, Shandong (CN); Bin Jiang, Shandong (CN); Xiaoyu Chi, Shandong (CN)

(73) Assignee: GOERTEK, INC., Shandong (CN)

( * ) Notice: Subject to any disclaimer, the term of this patent is extended or adjusted under 35 U.S.C. 154(b) by 0 days.

(21) Appl. No.: 18/248,502

(22) PCT Filed: Sep. 22, 2021

(86) PCT No.: PCT/CN2021/119648
§ 371 (c)(1),
(2) Date: Apr. 10, 2023

(87) PCT Pub. No.: WO2022/078169
PCT Pub. Date: Apr. 21, 2022

(65) Prior Publication Data
US 2023/0375838 A1    Nov. 23, 2023

(30) Foreign Application Priority Data
Oct. 12, 2020  (CN) .......................... 202011086094.0

(51) Int. Cl.
G02B 27/01     (2006.01)
G02F 1/133     (2006.01)
G06F 3/01      (2006.01)

(52) U.S. Cl.
CPC ..... G02B 27/0172 (2013.01); G02F 1/13306 (2013.01); G06F 3/013 (2013.01);
(Continued)

(58) Field of Classification Search
None
See application file for complete search history.

(56) References Cited

U.S. PATENT DOCUMENTS 10,402,950 B1 * 9/2019 Geng .................... G06T 5/006
2007/0285795 A1  12/2007 Tsan et al.
(Continued)

FOREIGN PATENT DOCUMENTS

CN     101561347 A     10/2009
CN     102098442 A     6/2011
(Continued)

*Primary Examiner* — Christopher J Kohlman
(74) *Attorney, Agent, or Firm* — LKGlobal | Lorenz & Kopf, LLP

(57) ABSTRACT

An imaging method of a head-mounted display and a head-mounted display are disclosed. The method includes, but is not limited to: detecting a wavefront of a beam emitted by the head-mounted display through its optical system; acquiring a position of a visual axis of a human eye; calculating a deviation between the visual axis of the human eye and an optical axis of the optical system; and adjusting a wavefront incident to the human eye according to the deviation, so that a correspondence between the wavefront incident to the human eye and the visual axis is consistent with a correspondence between the wavefront of the beam emitted from the optical system and the optical axis.

8 Claims, 4 Drawing Sheets

(52) U.S. Cl.
CPC .. *G02B 2027/011* (2013.01); *G02B 2027/014* (2013.01); *G02B 2027/0138* (2013.01); *G02F 2203/01* (2013.01); *G02F 2203/18* (2013.01)

(56) References Cited

U.S. PATENT DOCUMENTS

| | | |
|---|---|---|
| 2013/0050642 A1 | 2/2013 | Lewis et al. |
| 2013/0169683 A1 | 7/2013 | Perez et al. |
| 2017/0161951 A1* | 6/2017 | Fix ............................ G06T 5/00 |
| 2018/0045960 A1* | 2/2018 | Palacios ................ G02F 1/1343 |

FOREIGN PATENT DOCUMENTS

| | | |
|---|---|---|
| CN | 105652444 A | 6/2016 |
| CN | 108061968 A | 5/2018 |
| CN | 108399001 A | 8/2018 |
| CN | 108632599 A | 10/2018 |
| CN | 109788901 A | 5/2019 |
| CN | 112213859 A | 1/2021 |
| EP | 0007039 A1 | 1/1980 |
| JP | H09211377 A | 8/1997 |
| JP | 2016218313 A | 12/2016 |
| WO | 2009101960 A1 | 8/2009 |
| WO | 2020028867 A1 | 2/2020 |

\* cited by examiner

IMAGING METHOD FOR A HEAD-MOUNTED DISPLAY AND HEAD-MOUNTED DISPLAY

CROSS-REFERENCE TO RELATED APPLICATIONS

This Application is a U.S. National-Stage entry under 35 U.S.C. § 371 based on International Application No. PCT/CN2021/119648, filed Sep. 22, 2021 which was published under PCT Article 21(2) and which claims priority to Chinese Application No. 202011086094.0, filed Oct. 12, 2020, which are all hereby incorporated herein in their entirety by reference.

TECHNICAL FIELD

This application pertains to the technical field of head-mounted displays, and specifically relates to an imaging method for a head-mounted display.

BACKGROUND

Head-mounted display is a video playback device that magnifies the image on the ultra-micro display screen through an optical system (mainly precision optical lenses), projects the image onto the retina, and then presents a large-screen image to the eyes of the viewer. It can achieve different display effects such as virtual reality (VR), augmented reality (AR), mixed reality (MR) and so on.

The optical technology of head-mounted displays plays a very important role in improving user experience. However, in the current head-mounted display, in the design process of the optical system, the difference between the visual axis S of the human eye and the optical axis G of the optical system is often not considered. Moreover, in the actual use of the head-mounted display, the fixation point of the human eye will change to a certain extent, resulting in the more obvious difference between the optical axis G and the visual axis S of the human eye, as shown in FIG. 1. This difference will make the optical system that is not ideal for imaging generate more obvious asymmetric aberrations, such as comatic aberrations, and then affect the clearness of imaging and reduce the use experience.

In the conventional fundus micro-imaging technology, the aberration measurement process is very complicated. From a point light source to a surface light source, from the first beam to the second beam, seven lenses need to be used for various detection to obtain aberrations, which leads to a very complicated detection system and is not conducive to the miniaturization of the product structure. Currently, the wavefront aberration detection can be achieved by only using a Shack-Hartmann sensor, and the system structure is relatively simple, which is conducive to the miniaturization design of the product. Regarding the correction method, in the prior art, the position calibration auxiliary optical path is used to calibrate the pupil of the human eye, and then a correction device is used to adjust the beam direction to make the pupil consistent with the beam. However, there is actually a problem. Namely, the so-called pupil being consistent with the beam means that the optical axis of the pupil is consistent with the optical axis of the beam, but the optical axis of the pupil does not coincide with the visual axis of the human eye, so the image seen still has a large wavefront aberration, which affects the image quality.

The above information disclosed in the background part is only used to assist the understanding of the background of the present disclosure. Therefore, it may include content that does not constitute the prior art known to a person having ordinary skill in the art. In addition, other objects, desirable features and characteristics will become apparent from the subsequent summary and detailed description, and the appended claims, taken in conjunction with the accompanying drawings and this background.

SUMMARY

The object of the present disclosure is to provide an imaging method for a head-mounted display, which can improve the imaging quality and enhance the user experience by solving the problem that the asymmetric aberration becomes more obvious due to the non-coincidence of the visual axis of the human eye and the optical axis of the optical system.

In order to achieve the object of the present disclosure, the present disclosure adopts the following technical solutions.

In an aspect, the present disclosure provides an imaging method for a head-mounted display, which comprises:
  detecting a beam wavefront emitted by the head-mounted display through its optical system;
  acquiring a position of a visual axis of a human eye;
  calculating a deviation between the visual axis of the human eye and an optical axis of the optical system; and
  adjusting a wavefront incident to the human eye according to the deviation, so that a correspondence between the wavefront incident to the human eye and the visual axis is consistent with a correspondence between the beam wavefront emitted from the optical system and the optical axis.

In some embodiments of the present disclosure, the process of acquiring the position of the visual axis of the human eye comprises:
  acquiring a fixation point of the human eye on a display screen of the head-mounted display by using eyeball tracking technology;
  acquiring a position of a pupil of the human eye; and
  taking a connection line between the fixation point and a center of the pupil as the position of the visual axis of the human eye.

In some embodiments of the present disclosure, the process of calculating the deviation between the visual axis of the human eye and the optical axis of the optical system comprises:
  establishing a rectangular coordinate system by performing cross calibration with an intersection point of the optical axis of the optical system and a display screen as an origin A (0,0);
  acquiring coordinates (x, y) of the fixation point B of the human eye on the display screen; and
  calculating a distance p between points A and B and an included angle θ between a connection line of points A and B and Y axis.

In some embodiments of the present disclosure, the process of adjusting the wavefront incident to the human eye according to the deviation comprises:
  calculating, by using a Zernike polynomial, wavefront data W2 of the human eye when looking at the fixation point B according to the ρ and θ;
  calculating a relative change of wavefront aberration ΔW according to the wavefront data W2 and data W1 of the beam wavefront emitted from the optical system; and adjusting the wavefront incident to the human eye according to the relative change ΔW to achieve wavefront correction.

In some embodiments of the present disclosure, the process of adjusting the wavefront incident to the human eye according to the relative change ΔW comprises:

installing a wavefront corrector on a side of the optical system facing toward the human eye; and adjusting the wavefront incident to the human eye according to the relative change ΔW by using the wavefront corrector, so that the correspondence between the wavefront incident to the human eye and the visual axis is consistent with the correspondence between the beam wavefront emitted from the optical system and the optical axis.

In another aspect, the present disclosure also proposes a head-mounted display, which comprises: a display screen, an optical system, a wavefront detector, a camera, a wavefront corrector and a processor, wherein the wavefront detector is for detecting a beam wavefront emitted from the optical system; the camera is for collecting an eyeball image of a wearer; the wavefront corrector is installed on a side of the optical system facing toward a human eye and for adjusting a wavefront incident to the human eye; the processor is for receiving wavefront data detected and output by the wavefront detector, determining a visual axis of the human eye according to the eyeball image collected by the camera, calculating a deviation between the visual axis of the human eye and an optical axis of the optical system, and controlling the wavefront corrector to adjust the wavefront incident to the human eye according to the deviation, so that a correspondence between the wavefront incident to the human eye and the visual axis is consistent with a correspondence between the beam wavefront emitted from the optical system and the optical axis of the optical system.

In some embodiments of this application, the processor determines a fixation point of the human eye on the display screen and a position of a pupil of the human eye, preferably, by using eyeball tracking technology, according to the eyeball image collected by the camera, and takes a connection line between the fixation point and a center of the pupil as the position of the visual axis of the human eye.

In some embodiments of this application, the processor establishes a rectangular coordinate system by performing cross calibration with an intersection point of the optical axis of the optical system and the display screen as an origin A (0,0); acquires coordinates (x, y) of the fixation point B; and determines the deviation between the visual axis of the human eye and the optical axis of the optical system by calculating a distance ρ between points A and B and an included angle θ between a connection line of points A and B and Y axis.

In some embodiments of the present disclosure, the processor calculates, preferably, by using a Zernike polynomial, wavefront data W2 of the human eye when looking at the fixation point B according to the ρ and θ obtained; calculates a relative change ΔW of wavefront aberration according to the wavefront data W2 and the wavefront data W1 detected and output by the wavefront detector; and controls the wavefront corrector to correct the wavefront incident to the human eye according to the relative change ΔW.

In some embodiments of the present disclosure, the wavefront corrector is provided therein with a transmissive liquid crystal unit, a drive circuit and a liquid crystal spatial light modulator, the processor generates a control signal according to the relative change ΔW and sends it to the liquid crystal spatial light modulator to generate a modulation signal and adjust a voltage applied to the transmissive liquid crystal unit through the drive circuit, so as to correct the beam wavefront emitted through the transmissive liquid crystal unit, so that the correspondence between it and the visual axis is consistent with the correspondence between the beam wavefront emitted from the optical system and the optical axis of the optical system.

Compared with the prior art, the present disclosure have the following advantages and positive effects. The head-mounted display according to the present disclosure determines the aberration compensation amount by comparing the deviations between the visual axis of the human eye and the optical axis of the optical system, and adjusts the wavefront incident to the human eye according to the aberration compensation amount, so that the correspondence between it and the visual axis of the human eye is completely consistent with the correspondence between the beam wavefront emitted from the optical system and its optical axis, and thus the problem that the asymmetric aberration caused by non-coincidence of the visual axis and the optical axis becomes more obvious can be solved, and then the unclear image defect caused by the asymmetric aberration can be improved, and finally an imaging effect consistent with when the visual axis and the optical axis are coincident is achieved, thereby significantly improving the imaging quality and user experience.

Other features and advantages of the present disclosure will become clearer by reading the following detailed description of the exemplary embodiments of the present disclosure with reference to the accompanying drawings.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The specific embodiments of the present disclosure will be further described in detail in conjunction with the accompanying drawings.

Figure 1:
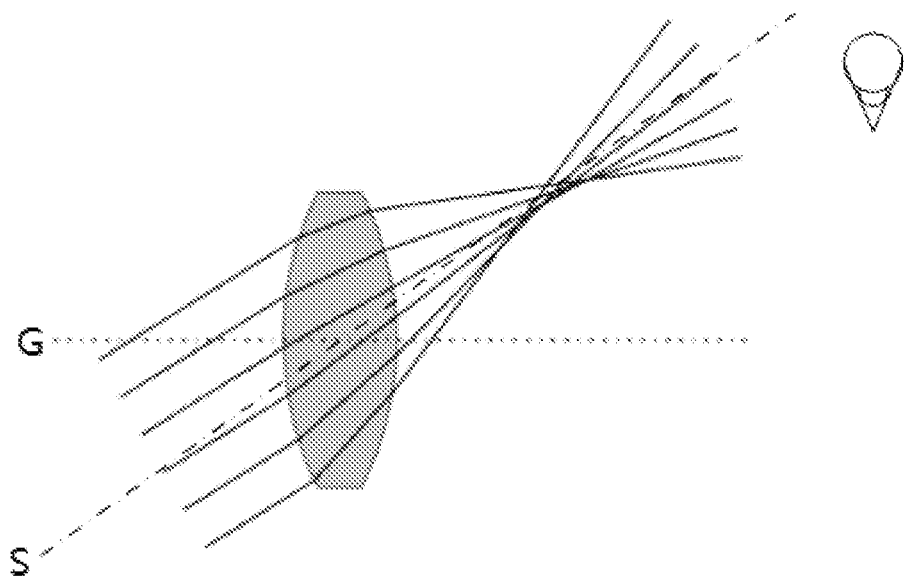
FIG. 1 is a schematic diagram of non-coincidence of a visual axis of the human eye and an optical axis of an optical system.
Figure 2:
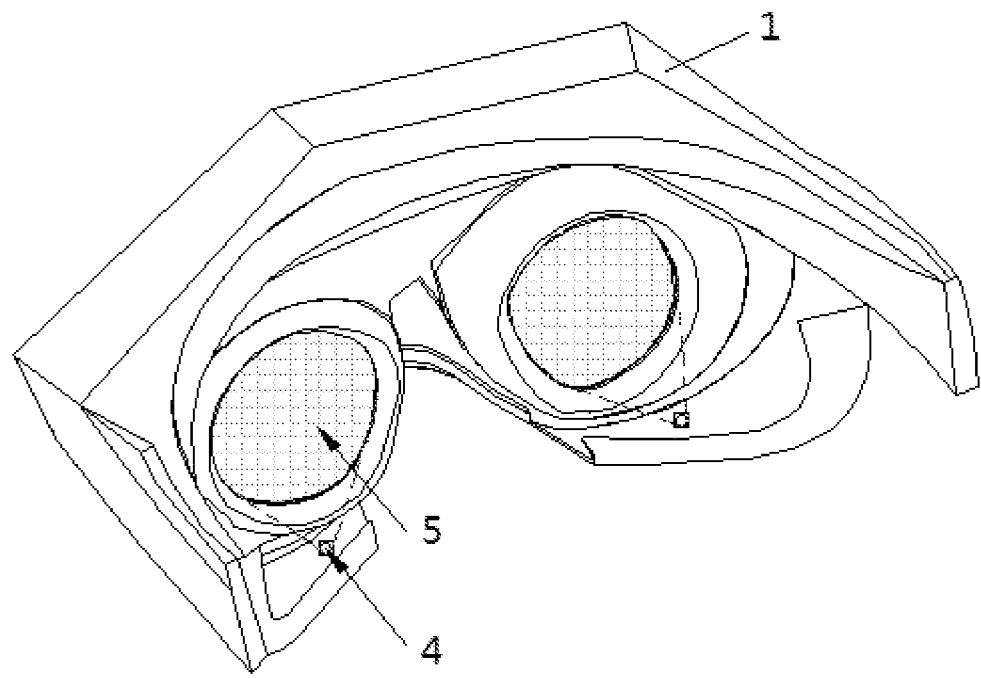
FIG. 2 is a schematic diagram of the structure of a head-mounted display according to an embodiment of the present disclosure.
Figure 3:
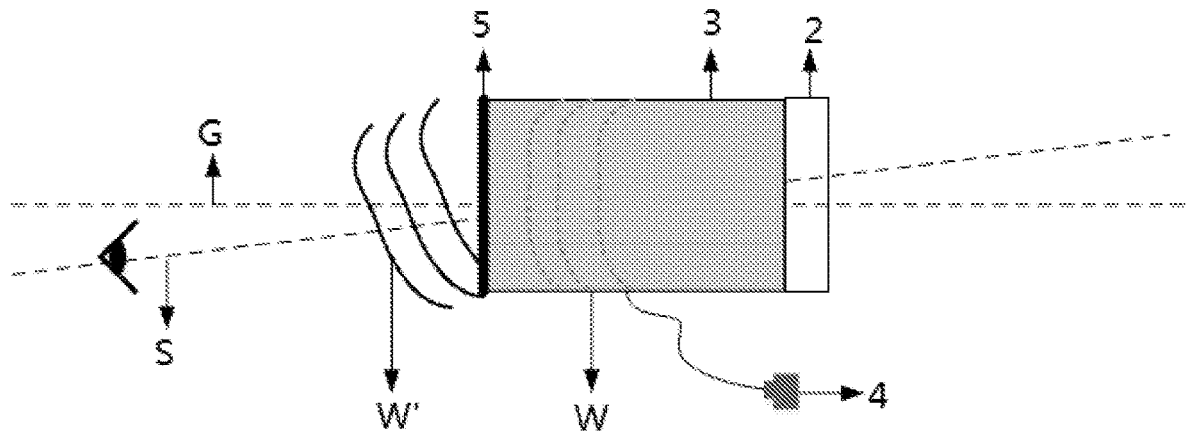
FIG. 3 is a schematic diagram of the working principle of the head-mounted display shown in FIG. 2.

Refer to FIG. 2 and FIG. 3, the head-mounted display in this embodiment mainly comprises a display body and a head-mounted assembly connected to the display body. The display body is used to project the image into the eyes of the device wearer, and comprises a casing 1 and optical or electronic components installed in the casing 1, such as a display screen 2, an optical system 3, and a camera. The head-mounted assembly is used to wear the display body on the user's head and in front of the human eye. It can be designed as a strap type or a glasses frame type.

The conventional optical systems 3 are designed to be a lens module composed of multiple optical lenses. The image displayed on the display screen 2 is emitted from the optical system 3 and projected into the eyes of the wearer. Since in the actual use, the visual axis S of the human eye and the optical axis G of the optical system 3 are often in a relatively changing state, when the optical axis S of the human eye does not coincide with the optical axis G of the optical system 3, it will make the optical system that is not ideal for imaging generate a more obvious asymmetric aberration, and then seriously affect the imaging clearness of the head-mounted display.

In order to improve the imaging quality of the head-mounted display, first of all, in the structural design, in this embodiment, a wavefront detector 4 and a wavefront corrector 5 are added on the display body of the head-mounted display, as shown in FIG. 2 and FIG. 3. The wavefront detector 4 can be installed on the casing 1 and located on the side facing toward the human eye, and is used to detect the wavefront W of the beam emitted from the optical system 3. The wavefront refers to an isophase surface, i.e., a curvy surface generated by a set of points having the same phase. After the optical system 3 is installed in place, the position of its optical axis G is fixed. After the wavefront detector 4 detects the wavefront W of the beam emitted from the optical system 3, the correspondence between the wavefront W of the beam emitted from the optical system 3 and the optical axis G of the optical system 3 can be determined.

The wavefront corrector 5 may be installed on the casing 1 and located behind the optical system 3, i.e., on the side closer to the human eye than the optical system 3, and is used to adjust the wavefront W' of the beam incident to the human eye. By adjusting the wavefront W' of the beam incident to the human eye, the correspondence between it and the visual axis S of the human eye can be changed. When the correspondence between the wavefront W' of the beam incident to the human eye and the optical axis S is completely consistent with the correspondence between the wavefront W of the beam emitted from the optical system 3 and the optical axis G, the problem that the asymmetric aberration caused by non-coincidence of the optical axis G and the optical axis S becomes more obvious can be improved, so that the imaging effect in the human eye is closer to the display effect of the display screen 2, and thus the object of improving the imaging clearness of the head-mounted display can be achieved.

In this embodiment, the wavefront detector 4 may be a Shack-Hartmann sensor or other conventional miniaturized wavefront sensors to facilitate the layout on the casing 1 of the head-mounted display. The wavefront corrector 5 may be a wavefront correcting device based on a transmissive liquid crystal unit, which performs wavefront correction by adjusting the voltage applied to the liquid crystal. Of course, the wavefront corrector 5 may also be other conventional miniaturized and integrated wavefront correcting devices to be deployed on the casing 1 of the head-mounted display, which compensate and correct the wavefront W of beam emitted from the optical system 4 to obtain the wavefront W' of the beam incident into the wearer's eye.

Figure 6:
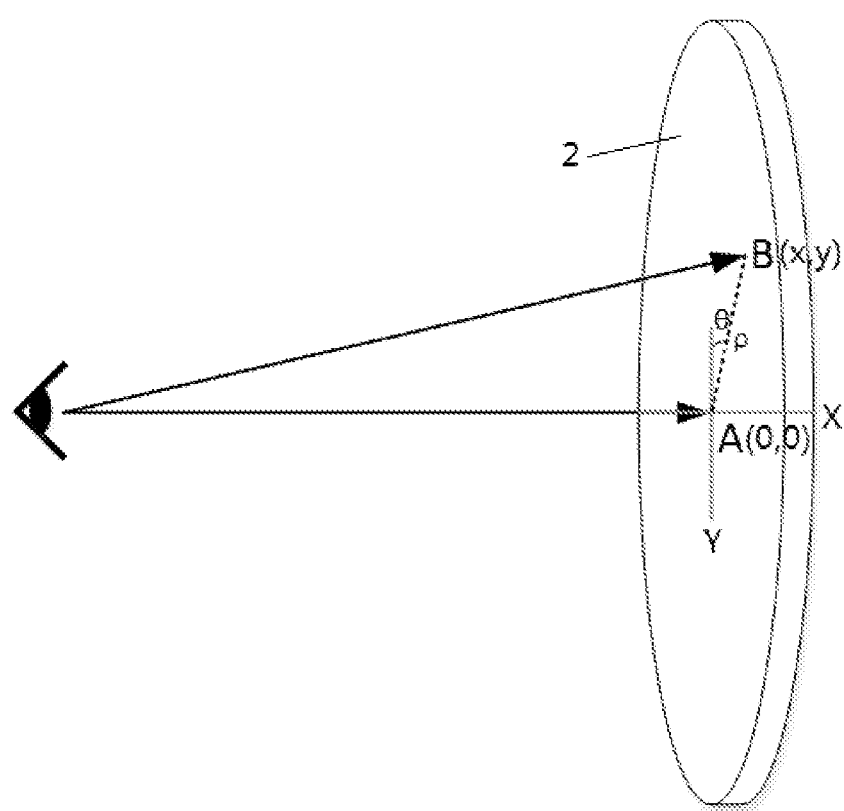
FIG. 6 shows the location of a fixation point.

In order to obtain the position of the visual axis S of the human eye, in this embodiment, first, the eyeball image of the wearer is collects by using a camera (not shown in the drawings) built in the head-mounted display, and then transmitted to the processor on the circuit board built in the head-mounted display for image processing; then, the position of fixation point B of the human eye on the display screen 2 and the position of the pupil of the human eye are calculated by using a conventional eyeball tracking algorithm, as shown in FIG. 6; finally, the connection line between the fixation point B and the center of the pupil is taken as the position of the visual axis S of the human eye. Here, the visual axis S of the human eye is different from the optical axis of the pupil. By determining the position of the visual axis S of the human eye in this way, when the wavefront corrector 5 is used to compensate and correct the wavefront W of the beam emitted from the optical system 4, as long as the correspondence between the beam wavefront W' after corrected and the optical axis S is consistent with the correspondence between the wavefront W of the beam emitted from the optical system 3 and the optical axis G, the problem that the asymmetric aberration caused by non-coincidence of the optical axis G and the optical axis S becomes more obvious can be improved, and then an imaging effect consistent with when the optical axis S and the optical axis G are coincident is achieved.

The specific adjustment method of the beam wavefront will be described in detail in conjunction with the above hardware design of the head-mounted display.

Figure 4:
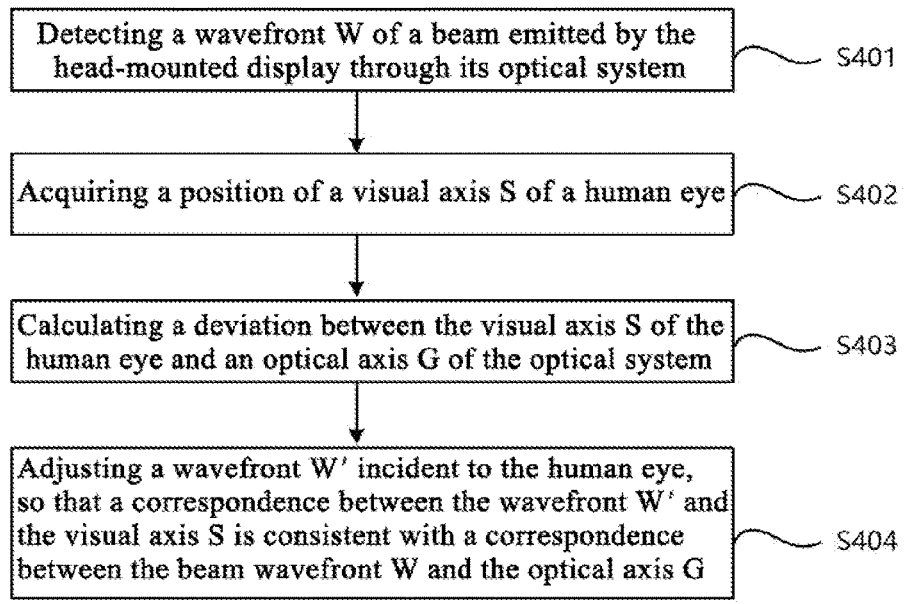
FIG. 4 is a flow chart of an imaging method of a head-mounted display according to an embodiment of the present disclosure.
Figure 5:
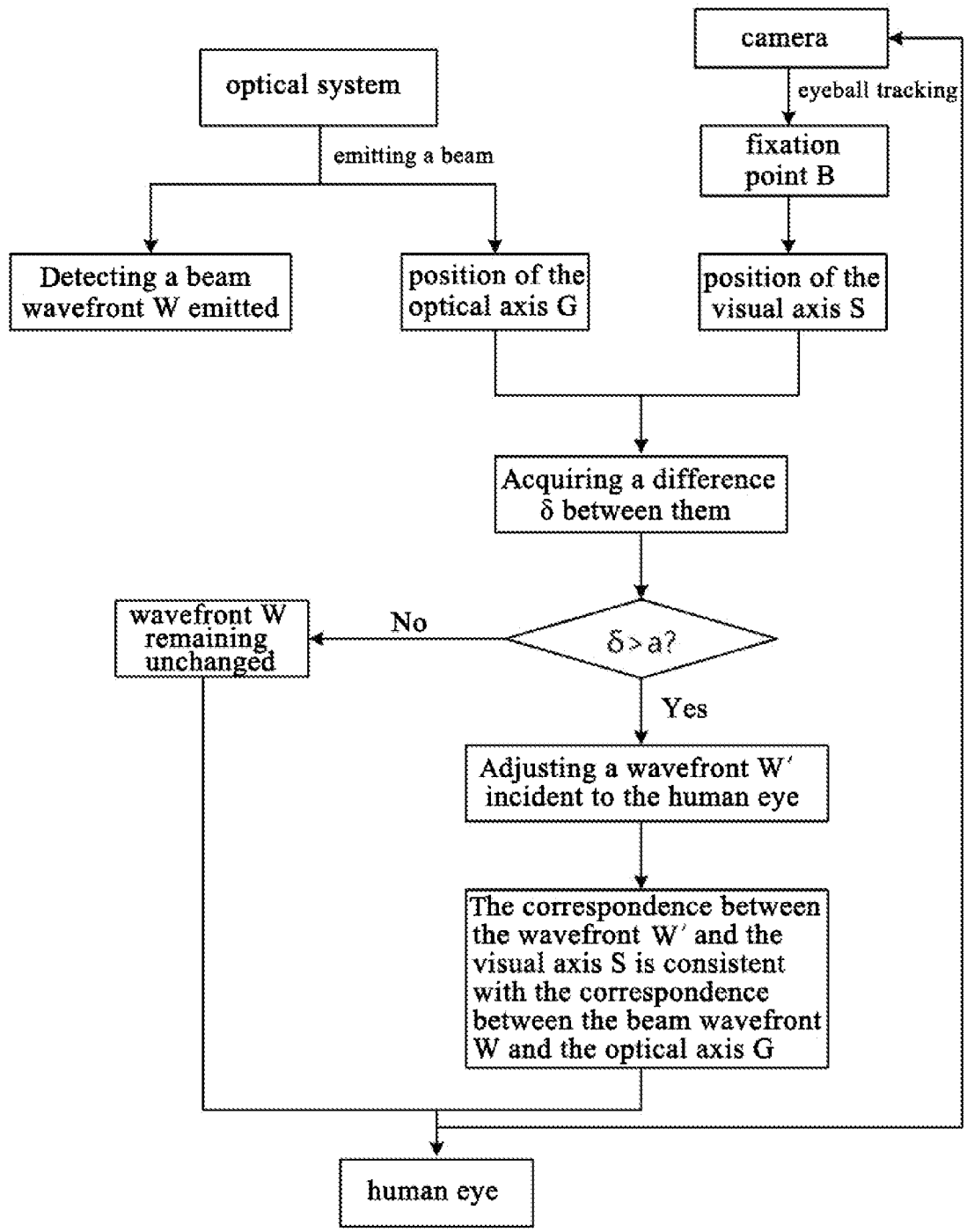
FIG. 5 is a detailed flow chart of an imaging method of a head-mounted display shown in FIG. 4.

As shown in FIG. 4 and FIG. 5, it comprises the following process:

S401 detecting a wavefront of a beam emitted by the head-mounted display through its optical system 3;

In this embodiment, the wavefront detector 4 is used to detect the wavefront W of the beam emitted from the optical system 3, and the wavefront data W1 is generated and sent to the processor built in the head-mounted display. The processor determines the correspondence between the beam wavefront W and the optical axis G according to the wavefront data W1 received and the position of the optical axis G of the optical system 3 that has been determined in advance.

S402 acquiring a position of the visual axis S of the human eye;

In this embodiment, the camera built in the head-mounted display may be used to collect the eyeball image of the wearer, and a mature conventional eyeball tracking technology may be used to determine the fixation point B of the human eye on the display screen 2 of the head-mounted display and the position of the pupil of the human eye, and the connection line between the fixation point B and the pupil center is taken as the position of the visual axis S of the human eye.

S403 calculating a deviation between the visual axis S of the human eye and the optical axis G of the optical system;

As shown in FIG. 6, in this embodiment, a rectangular coordinate system is established by performing cross calibration on the plane in which the display screen 2 is located, with an intersection point of the optical axis G of the optical system 3 and the display screen 2 as an origin A (0,0). The coordinates (x, y) of the fixation point B of the human eye on the display screen 2 is determined by using the eyeball tracking technology. The distance p between points A and B and the included angle θ between the connection line of points A and B and the Y axis can be calculated according to the coordinates of points A and B, namely:

$$\rho = (x^2 + y^2)^{1/2}$$

$$\theta = \arctan(x/y)$$

In order to avoid the frequent operating of the wavefront corrector 5, in this embodiment, preferably, a threshold value a is set, and a difference δ is determined according to the distance ρ between points A and B or according to the combination of the parameters p and θ. If the difference δ is greater than a, the subsequent wavefront correction process is executed; otherwise, the current wavefront W remains unchanged, and return to the step S402 to continue to track the position change of the visual axis G of the human eye.

S404 adjusting the wavefront W' incident to the human eye so that the correspondence between the wavefront W' incident to the human eye and the visual axis S of the human eye is consistent with the correspondence between the wavefront W of the beam emitted from the optical system 3 and the optical axis G;

In this embodiment, first, the wavefront data W2 of the human eye when looking at the fixation point B is calculated by using a Zernike polynomial, namely, $$W(\rho,\theta)=Z0+Z1\rho \cos\theta+Z2\rho \sin\theta+Z3(2\rho^2-1)+Z4\rho^2 \cos 2\theta+Z5\rho^2 \sin 2\theta+Z6(3\rho^2-2)\rho \cos\theta+Z7(3\rho^2-2)\rho \sin\theta+Z8(6\rho^4-6\rho^2+1)$$

where W2=W (ρ, θ); Z0 is a translation amount; Z1 is an inclination of X axis; Z2 is an inclination of Y axis; Z3 is a defocus amount; Z4 is an astigmatism at 0 degree and a defocus amount; Z5 is an astigmatism at 45 degrees and a defocus amount; Z6 is a comatic aberration and an inclination of X axis; Z7 is a comatic aberration and an inclination of Y axis; Z8 is a spherical aberration and a defocus amount. These coefficients can be obtained directly from the wavefront detector 4. When the human eye looks at the origin A, W2=W1; when the human eye is looking at any other point on the display screen 2, the wavefront data W2 of the human eye when looking at this point can be calculated by the above Zernike polynomial.

The relative change ΔW of wavefront aberration is calculated according to the calculated wavefront data W2 and the wavefront data W1 of the beam emitted from the optical system 3, and the wavefront W' incident to the human eye is adjusted according to the relative change ΔW to achieve the wavefront correction. The specific process is as follows.

The processor generates a control signal according to the calculated relative change ΔW and sends it to the wavefront corrector 5. The wavefront corrector 5 is provided with a transmissive liquid crystal unit, a driving circuit and a liquid crystal spatial light modulator. The liquid crystal spatial light modulator receives the control signal output by the processor, generates a modulated signal and transmits it to the driving circuit, and adjusts the voltage applied to the transmissive liquid crystal unit through the driving circuit to correct the wavefront W' of the beam emitted through the transmissive liquid crystal unit, so that the correspondence between the beam wavefront W' and the visual axis S of the human eye is consistent with the correspondence between the wavefront W of the beam emitted from the optical system 3 and the optical axis G. For example, if the wavefront W of the beam emitted from the optical system 3 is perpendicular to the optical axis G of the optical system, the wavefront W' of the beam incident to the human eye is adjusted by the wavefront corrector 5 to make it perpendicular to the visual axis S of the human eye, as shown in FIG. 3, thereby improving the imaging quality and the imaging clearness of the head-mounted display.

After performing this round of wavefront correction, the process may return to the step S402 to continue to track the position change of visual axis S and enter the next round of wavefront correction.

The head-mounted display according to this embodiment obtains the eyeball fixation point by using the eyeball tracking technology, and compares the differences between the visual axis and the optical axis, to improve the asymmetric aberration caused by non-coincidence of the visual axis and the optical axis through wavefront correction, thereby improving the imaging clearness and improving the user experience.

Of course, the above description is not a limitation of the present disclosure, and the present disclosure is not limited to the above examples. The changes, modifications, additions or replacements made by a person having ordinary skill in the art within the substantive scope of the present disclosure shall also fall within the protection scope of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An imaging method for a head-mounted display, comprising:
   detecting a wavefront of a beam emitted by the head-mounted display through its optical system;
   acquiring a position of a visual axis of a human eye;
   calculating a deviation between the visual axis of the human eye and an optical axis of the optical system; and
   adjusting a wavefront incident to the human eye according to the deviation, so that a correspondence between the wavefront incident to the human eye and the visual axis is consistent with a correspondence between the wavefront of the beam emitted from the optical system and the optical axis,
   wherein calculating the deviation between the visual axis of the human eye and the optical axis of the optical system comprises:
   establishing a rectangular coordinate system by performing cross calibration with an intersection point of the optical axis of the optical system and a display screen as an origin A (0,0);
   acquiring coordinates (x, y) of the fixation point B; and
   calculating a distance ρ between points A and B and an included angle θ between a connection line of points A and B and Y axis,
   adjusting the wavefront incident to the human eye according to the deviation comprises:
   calculating, by using a Zernike polynomial, wavefront data W2 of the human eye when looking at the fixation point B according to the ρ and θ;
   calculating a relative change of wavefront aberration ΔW according to the wavefront data W2 and wavefront data W1 of the beam emitted from the optical system; and
   adjusting the wavefront incident to the human eye according to the relative change ΔW to achieve wavefront correction.

2. The imaging method of the head-mounted display according to claim 1, wherein the process of acquiring the position of the visual axis of the human eye comprises:
  acquiring a fixation point of the human eye on a display screen of the head-mounted display by using eyeball tracking technology;
  acquiring a position of a pupil of the human eye; and
  taking a connection line between the fixation point and a center of the pupil as the position of the visual axis of the human eye.

3. The imaging method of the head-mounted display according to claim 2, wherein a process of adjusting the wavefront incident to the human eye according to the relative change $\Delta W$ comprises:
  installing a wavefront corrector on a side of the optical system facing toward the human eye; and
  adjusting the wavefront incident to the human eye according to the relative change $\Delta W$ by using the wavefront corrector, so that the correspondence between the wavefront incident to the human eye and the visual axis is consistent with the correspondence between the wavefront of the beam emitted from the optical system and the optical axis.

4. The imaging method of the head-mounted display according to claim 1, wherein a process of adjusting the wavefront incident to the human eye according to the relative change $\Delta W$ comprises:
  installing a wavefront corrector on a side of the optical system facing toward the human eye; and
  adjusting the wavefront incident to the human eye according to the relative change $\Delta W$ by using the wavefront corrector, so that the correspondence between the wavefront incident to the human eye and the visual axis is consistent with the correspondence between the wavefront of the beam emitted from the optical system and the optical axis.

5. A head-mounted display, comprising a display screen and an optical system, wherein the head-mounted display further comprises:
  a wavefront detector configured to detect a wavefront of a beam emitted from the optical system;
  a camera configured to collect an eyeball image of a wearer;
  a wavefront corrector installed on a side of the optical system facing toward a human eye and adjust a wavefront incident to the human eye;
  a processor configured to receive wavefront data detected and output by the wavefront detector, determine a visual axis of the human eye according to the eyeball image collected by the camera, establish a rectangular coordinate system by performing cross calibration with an intersection point of the optical axis of the optical system and the display screen as an origin A (0,0), acquire coordinates (x, y) of the fixation point B, determine the deviation between the visual axis of the human eye and the optical axis of the optical system by calculating a distance $\rho$ between points A and B and an included angle $\theta$ between a connection line of points A and B and Y axis, determine a deviation between the visual axis of the human eye and an optical axis of the optical system, calculate, by using a Zernike polynomial, wavefront data W2 of the human eye when looking at the fixation point B according to the $\rho$ and $\theta$ calculated, calculate a relative change $\Delta W$ of wavefront aberration according to the wavefront data W2 and the wavefront data W1 detected and output by the wavefront detector, and control the wavefront corrector to correct the wavefront incident to the human eye according to the relative change $\Delta W$, so that a correspondence between the wavefront incident to the human eye and the visual axis is consistent with a correspondence between the wavefront of the beam emitted from the optical system and the optical axis of the optical system.

6. The head-mounted display according to claim 5, wherein the processor determines a fixation point of the human eye on the display screen and a position of a pupil of the human eye by using eyeball tracking technology according to the eyeball image collected by the camera, and takes a connection line between the fixation point and a center of the pupil as the position of the visual axis of the human eye.

7. The head-mounted display according to claim 6, wherein the wavefront corrector is provided therein with a transmissive liquid crystal unit, a drive circuit and a liquid crystal spatial light modulator, the processor generates a control signal according to the relative change $\Delta W$ and sends it to the liquid crystal spatial light modulator to generate a modulation signal and adjust a voltage applied to the transmissive liquid crystal unit through the drive circuit, so as to correct a wavefront of a beam emitted through the transmissive liquid crystal unit, so that the correspondence between it and the optical axis is consistent with the correspondence between the wavefront of the beam emitted from the optical system and the optical axis of the optical system.

8. The head-mounted display according to claim 5, wherein the wavefront corrector is provided therein with a transmissive liquid crystal unit, a drive circuit and a liquid crystal spatial light modulator, the processor generates a control signal according to the relative change $\Delta W$ and sends it to the liquid crystal spatial light modulator to generate a modulation signal and adjust a voltage applied to the transmissive liquid crystal unit through the drive circuit, so as to correct a wavefront of a beam emitted through the transmissive liquid crystal unit, so that the correspondence between it and the optical axis is consistent with the correspondence between the wavefront of the beam emitted from the optical system and the optical axis of the optical system.

* * * * *